(12) United States Patent
Alam

(10) Patent No.: US 8,092,851 B2
(45) Date of Patent: *Jan. 10, 2012

(54) COMPOSITION AND PROCESS FOR CLEANING AND DISINFECTING FOOD PRODUCTS

(75) Inventor: Mohamed Alam, Jamaica, NY (US)

(73) Assignee: Mohamed B. Alam, Jamaica, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 11/903,741

(22) Filed: Sep. 24, 2007

(65) Prior Publication Data

US 2008/0075804 A1 Mar. 27, 2008

Related U.S. Application Data

(63) Continuation of application No. 10/046,061, filed on Jan. 11, 2002, now Pat. No. 7,273,630.

(60) Provisional application No. 60/261,117, filed on Jan. 12, 2001.

(51) Int. Cl.
A23B 4/12 (2006.01)
(52) U.S. Cl. ........................................ 426/326; 426/310
(58) Field of Classification Search ................. 426/310, 426/326, 532
See application file for complete search history.

(56) References Cited

U.S. PATENT DOCUMENTS

| | | | | |
|---|---|---|---|---|
| 3,843,805 A | * | 10/1974 | Powell | 426/92 |
| 4,852,216 A | * | 8/1989 | Clayton et al. | 426/332 |
| 4,937,092 A | * | 6/1990 | Brotsky et al. | 426/643 |
| 5,635,231 A | * | 6/1997 | Bender et al. | 426/332 |
| 6,039,984 A | * | 3/2000 | Bowling et al. | 426/61 |
| 6,120,812 A | * | 9/2000 | Harvey et al. | 426/66 |

FOREIGN PATENT DOCUMENTS

GB 18345 * 8/1913

OTHER PUBLICATIONS

Time Life Books: Foods of the World: Recipes: The Cooking of India p. 43 (1969).*
D'Aquino et al. "Lemon juice as a Natural Biocide" (Abstarct only) Bull Pan Am Health Organ Dec. 1994; 28(4):324-30, p. 1.*
Tomotake et al., NPL article "Antibacterial activity of citrus Juices" (Abstarct Only), Journal of Nutr Sci Vitaminol (Tokyo), Apr. 2006; 52(2):157-60, p. 1.*

* cited by examiner

Primary Examiner — Jyoti Chawla
(74) Attorney, Agent, or Firm — Alfred M. Walker

(57) ABSTRACT

A composition and process for improving the quality of raw food product such as seafood, meat and fowl including a treatment of a bath, rinse, ice blend, steam or spray for preparing the raw food product, such as fresh fish, meat or poultry or produce. Before the treatment is used, the raw product is cleaned in a conventional manner. The treatment composition is intended to clean, deodorize, and disinfect the raw food product. The present invention removes slime and odor from fresh fish in preparation for cooking, and further, disinfects the fish and other food product to be cooked in the event that harmful bacteria or other microbes reside on the raw fish, such as harmful microorganisms which may be a residue of polluted water from which the fish was taken, or may have originated from filthy food preparation facilities.

13 Claims, No Drawings

COMPOSITION AND PROCESS FOR CLEANING AND DISINFECTING FOOD PRODUCTS

RELATED APPLICATIONS

This application is a continuation of application Ser. No. 10/046,061, filed Jan. 11, 2002 now U.S. Pat. No. 7,273,630 and claims priority under 35 U.S.C. §120, which application claimed benefit under 35 U.S.C. §119(e) of provisional application Ser. No. 60/261,117, filed Jan. 12, 2001.

FIELD OF THE INVENTION

The instant invention relates to a composition and process for cleaning and disinfecting food products, such as a fish or other seafood products. The composition and process is also useful for meat products, including hamburger beef, sausage, hot dogs and poultry. In particular, it relates to exposing the product to the composition, such as by grinding ice blends, smokehouse rinse cycles, steam skinning, topical application by spraying the product or immersing the product in a treatment bath of lemon juice, lime juice, salt, vinegar, turmeric powder and water for killing bacteria and loosening scaly or rough surfaces, while maintaining a pleasant organoleptic taste for the consumer of the product. The composition and process cleans a product, such as a scaled fish of oily film and tissues while at the same time maintaining the taste and textural consistency of the fish or other meat product. Furthermore, the composition and process can be used to sanitize food preparation surfaces and equipment in restaurant and home kitchens. In agriculture, the composition and process can be used for a feed spray to sanitize livestock feed materials and can be used as a livestock wash for the eyes and mouth of livestock, such as cattle or sheep.

BACKGROUND OF THE RELATED ART

The past few years have been especially tough on the food industry. Recalls have damaged many brands and entire companies and put in question the public's confidence in the wholesomeness of foods in general. Since the tragedy of Sep. 11, 2001, there is a heightened alert for the dangers of contaminated food. Product recalls may have a catastrophic effect like never before. Since Sep. 11, 2001, the public react differently to the dangers of food contamination and the media is on heightened alert. The risk factors for a food related industry with such an event has gone from possible costly product recalls to certain economic devastation.

Although several substances are known in the art for treating and scaling the surfaces of different fish, removing such surfaces of scales and oil subcutaneous films, no commercial composition or process is known or suggested which permits the cleaning and disinfecting of a fish without causing the treated fish to shrivel up and assume a "pickled" texture, while a disinfecting of bacteria from the fish. For example, in U.S. Pat. No. 3,706,333 to Ammerman, a process is described for cleaning fish in a caustic bath, and in U.S. Pat. No. 4,951,155 to Pack a process is described for descaling fish by immersing the fish in an aqueous bath of vinegar and water. Such processes, however, unlike the present composition and process, damage the inherent textural consistency of the fish fillet meat, and leave an acidic odor.

Other prior art patents include U.S. Pat. No. 4,944,957 of Kingsley and U.S. Pat. No, 2,383,907 of Beechem, as well as United Kingdom Patent No. 18,345 of Danilevsky. Kingsley concerns use of citric acid for odor treatment and Danilevsky uses acetic acid to preserve fish. Beechem claims to describe acids to kill bacteria, but cites as an example 10% nitric acid to clean hard shelled beans.

OBJECTS OF THE INVENTION

It is therefore an object of the present invention to clean and disinfect edible food products, such as fish or meat, while maintaining a pleasant organoleptic taste for the consumer of the product.

SUMMARY OF THE INVENTION

In accordance with the present invention there is provided an aqueous composition which is suitable for treating by immersion a meat product, such as an uncooked fish therein, whether fresh or thawed from a frozen state, to remove a variety of undesirable filmy substances and subcutaneous debris while retaining a fresh odor to the fish for cooking and maintaining the textural consistency and appearance of the fish fillet materials.

The composition and process may also be used on meats, such as pork, beef or poultry, or other types of seafood, such as lobster, shrimp and shellfish, whether fresh or thawed from a frozen state.

Among the materials used in the composition of the invention in which the food product may be immersed, the following may be mentioned, without implying any limitation, namely, water, 5% white vinegar solution (acetic acid), lemon juice, lime juice, salt and turmeric. Preferably the lemon juice is fresh squeezed lemon juice and the lime juice is fresh squeezed lime juice.

A preferred embodiment for the process for cleaning and disinfecting raw meat, includes the steps of:

a) providing a raw meat sample to be treated;

b) immersing said raw meat sample in a treatment bath comprised by volume of a composition comprising an aqueous mixture of about 49.2% by volume of water, about 8% by volume of a 5% vinegar solution, about 21% of lemon juice, about 21% by volume of lime juice, about 0.4% of salt and about 0.4% of turmeric, for a period of time sufficient to clean, deodorize and disinfect the raw meat sample without adversely affecting the texture thereof, said immersion step including a period of at least 30 seconds of vigorous agitation before removing the meat sample from the treatment bath; and c) removing the meat sample from the treatment bath and washing the same with water.

For example, oily films and subcutaneous debris on the surface of a fish may be easily cleaned by treatment with the composition of the invention since, as the fish is immersed for a period of time, generally 5-7 minutes, these undesirable substances are removed in the aqueous solution, thus avoiding in consequence the final step of cleaning these substances with knives. It is to be understood that the treatment composition of the invention may be applied to previously scaled fish fillets. The composition thus obtains a clean fish fillet which is also highly disinfected of bacteria, thus increasing its desirability for cooking.

A laboratory conducted a bacterial analysis and count on raw fresh fish prepared and treated in the manner of the present invention both before and after the application of the fish cleaning bath confirms the bacterial disinfecting efficacy of the composition and process of the present invention. It is also found that the treatment composition and process of the invention inhibits and/or reduces growth of bacterial infection on raw foods such as beef, pork, fowl, and the like.

The composition and process cleans and disinfects food products, such as a fish or other seafood products. The composition and process is also useful for meat products, including hamburger beef, sausage, hot dogs and poultry. In particular, it relates to exposing the product to the composition, such as by grinding ice blends, smokehouse rinse cycles, steam skinning, topical application by spraying the product or immersing the product in a treatment bath of lemon juice, lime juice, salt, vinegar, turmeric powder and water for killing bacteria and loosening scaly or rough surfaces, while maintaining a pleasant organoleptic taste for the consumer of the product. The composition and process cleans a product, such as a scaled fish of oily film and tissues while at the same time maintaining the taste and textural consistency of the fish or other meat product. Furthermore, the composition and process can be used to sanitize food preparation surfaces and equipment in restaurant and home kitchens. In agriculture, the composition and process can be used for a feed spray to sanitize livestock feed materials and can be used as a livestock wash for an orifice, such as the eyes and mouth of livestock, such as cattle or sheep. Moreover, the composition can be applied to displayed produce, by spraying or surface rinse for freshness and extended shelf life.

The composition and process of the present invention removes subcutaneous slime and odor from fresh fish or meat in preparation for cooking, and further, disinfects the fish or meat to be cooked in the event that harmful bacterial or other microorganisms reside on the raw fish or meat. Such harmful microorganism may be a residue of polluted water from which the fish was taken, or may have originated from filthy food preparation facilities of either fish or meat products.

Raw fresh fish normally has an odor which can be removed by the use of the fish cleaning composition of the invention. Such fish odors emanate from the proteins and oils inherent in raw fresh fish. The combined lemon juice and lime juice of the present composition, together with the 5% vinegar solution and turmeric have a unique ability to remove the normal "fishy" odor of raw fresh fish, and replace that odor with a slight citrus odor which masks an acidic, vinegary odor which emanates if just vinegar is used as in Pack '355. The slight citrus odor is the result of combined lemon and lime scents from the natural fruit juices used in the invention. This citrus odor adds to the flavor and appeal of the fish both before and after cooking.

The fish cleaning bath also has the effect of removing the natural slime coating inherently found in or upon most raw fresh fish after descaling. The result of using the fish cleaning bath of the invention on raw fish is that after such treatment, the fish has a non-slippery feel, and is thus fare more appealing to a consumer who purchases and prepares the fish for consumption.

The present invention further kills or removes pathogenic bacteria which may be upon the surface of raw fresh fish before cooking. Such bacteria may originate in polluted water from which the fish was taken, or from unclean food preparation surfaces with which the raw fish comes in contact during preparation for cooking.

This disinfecting aspect of the present invention is confirmed in laboratory testing.

DESCRIPTION OF THE PREFERRED EMBODIMENT

The present invention is both a treatment composition, which is a combination of ingredients, and a process, which is the cleaning, de-sliming, disinfection and deodorizing of raw fish to be cooked by using the treatment composition of the invention in a fish cleaning bath.

Alternatively, the treatment composition and process may be used for other raw meat products, such as beef, pork, poultry and other types of seafood, such as crustaceans and shellfish.

A typical preferred embodiment of the treatment composition contains the following proportion of ingredients:

| | | |
|---|---|---|
| Water 0.5 Gallons | 64 fluid ounces | 50% |
| 5% White Vinegar Solution | 10 fluid ounces | 8% |
| Lemon Juice | 27 fluid ounces | 21% |
| Lime Juice | 27 fluid ounces | 21% |
| Total Liquid Volume per batch 1.0 Gallon | 128 fluid ounces | 100% |

Admixed in the above Mixture are the following solid ingredients in the following preferable amounts:

| | |
|---|---|
| 3 Teaspoons | Table Salt |
| 3 Teaspoons | Tumeric |

The fish cleaning bath is used in the following manner. First, a raw fresh fish is cleaned and eviscerated and its scales, if any, are removed by hand or by machine. The raw fish is then immersed in the fish cleaning bath for 4-8 minutes, preferably 5-7 minutes, depending on the acid concentration of the treatment composition. If exceeding 7 to 10 minutes immersion at the above identified concentration, the fish cleaning bath may begin to decompose the flesh of the raw fish, giving an unacceptable result in which the fish flesh breaks apart easily, which is what was observed when fish were immersed in the Pack '355 solution of vinegar and water.

After the raw fresh fish has been immersed for 4-8 minutes, preferably 5-7 minutes, the fish cleaning bath, with the raw fresh fish therein, is vigorously agitated, either mechanically or by hand for 30-45 seconds. Agitation mechanically removes gross filth or soil which may be lodged upon the surface of the raw fish. When the vigorous agitation is complete, the raw fresh fish is removed from the fish cleaning bath and is thoroughly rinsed in cold water, after which the fish is ready for further preparation or for immediate cooking. The total time in which the fish is immersed in the bath is 4-8 minutes, preferably 5-7 minutes soaking time and an additional 30-4 seconds during which there is vigorous mechanical agitation. When the aforementioned concentrations are used, the raw fresh fish should not be exposed to the fish cleaning bath for more than 8 minutes. However, if lower concentrations of the components are used, then the immersion time may be 12 minutes.

After being rinsed, the fish flesh is firm, has either no odor at all or a slight citrus odor, has no slippery feel, and is substantially free from pathogenic bacteria which originated either in the water from which the fish was taken or from unclean food preparation surfaces.

Therefore, the present invention is a combination of ingredients and proportions thereof comprising a treatment composition and treatment process for preparing raw fresh fish for cooking. Before the composition of the present invention is used, the raw fresh fish is scaled and cleaned in a conventional manner. Such conventional cleaning involves eviscerating the fish, optionally removing the head, and removing any scales by conventional means.

The treatment of the present invention is intended to clean, deodorize, and disinfect the raw fresh fish after conventional cleaning and before cooking.

The solid ingredients admixed with the above mixture may be varied as follows:

| Amount: | Preferably: | Ingredient: |
|---|---|---|
| 1-5 teaspoons | 5 tsp/gallon | Table Salt |
| 1-5 teaspoons | 2 tsp/gallon | Tumeric |

The above composition may be used in accordance with the practice of the invention with a time, but immersion time is shorter, up to 6 minutes maximum.

The original composition may be also used in the treatment process with a time variation but immersion time is shorter, such as up to 4 minutes maximum.

In alternate embodiments of the aforementioned preferred composition, the following variants of proportional ingredients are presented as also being suitable.

The proportions of ingredients in the composition may be varied as noted below designated as Variant 1, wherein somewhat less water is used with an increased amount of vinegar.

| Water | 40 fluid ounces | 31% |
|---|---|---|
| 5% White Vinegar Solution | 34 fluid ounces | 27% |
| Lemon Juice | 27 fluid ounces | 27% |
| Lime Juice | 27 fluid ounces | 21% |
| Total Liquid Volume per batch 1.0 Gallon | 128 fluid ounces | 100% |

Admixed in the above Mixture are the following solid ingredients:

| 1-5 teaspoons per gallon | Table Salt |
|---|---|
| 1-5 teaspoons per gallon | Tumeric |

The immersion time suitable for use in the treatment process hereinabove described is substantially the same as previously reported, i.e. from about 4 minutes to 8 minutes maximum immersion plus the time for vigorous agitation.

Another variation of the composition, including more water, a lower concentration of vinegar wherein the immersion time remains 8 minutes maximum is summarized below.

| Water | 69 fluid ounces | 54% |
|---|---|---|
| 5% White Vinegar Solution | 5 fluid ounces | 4% |
| Lemon Juice | 27 fluid ounces | 21% |
| Lime Juice | 27 fluid ounces | 21% |
| Total Liquid Volume per batch 1.0 Gallon | 128 fluid ounces | 100% |

Admixed in the above Mixture are the following solid ingredients:

| 1-5 teaspoons per gallon | Table Salt |
|---|---|
| 1-5 teaspoons per gallon | Tumeric |

Preferably, the solid ingredients are in the following amounts:

| 3 teaspoons per gallon | Table Salt |
|---|---|
| 3 teaspoons per gallon | Tumeric |

The immersion time suitable for use in the treatment process with the above composition is substantially the same, i.e. from about 4 minutes to 9 minutes maximum immersion plus the time for vigorous agitation.

In another variant, as summarized below, there is less water, same vinegar, more citrus juice and the immersion time remains 8 minutes maximum.

| Water | 40 fluid ounces | 32% |
|---|---|---|
| 5% White Vinegar Solution | 10 fluid ounces | 8% |
| Lemon Juice | 39 fluid ounces | 30% |
| Lime Juice | 39 fluid ounces | 30% |
| Total Liquid Volume per batch 1.0 Gallon | 128 fluid ounces | 100% |

Admixed in the above Mixture are the following solid ingredients:

| 1-5 teaspoons per gallon | Table Salt |
|---|---|
| 1-5 teaspoons per gallon | Tumeric |

Preferably, the solid ingredients are in the following amounts:

| 3 teaspoons per gallon | Table Salt |
|---|---|
| 3 teaspoons per gallon | Tumeric |

Suitable immersion times with this variant of the composition of the invention is similar to that used with the previously reported compositions, i.e. from about 4 minutes to 8 minutes maximum immersion plus the time for vigorous agitation.

In a further variation, designated as composition Variant 4, the composition is prepared with more water, same vinegar, with less citrus and the immersion time remains 8 minutes maximum.

| Water | 84 fluid ounces | 32% |
|---|---|---|
| 5% White Vinegar Solution | 10 fluid ounces | 8% |
| Lemon Juice | 17 fluid ounces | 30% |
| Lime Juice | 17 fluid ounces | 30% |
| Total Liquid Volume per batch 1.0 Gallon | 128 fluid ounces | 100% |

Admixed in the above Mixture are the following solid ingredients:

| | |
|---|---|
| 1-5 teaspoons per gallon | Table Salt |
| 1-5 teaspoons per gallon | Tumeric |

Preferably, the solid ingredients are in the following amounts:

| | |
|---|---|
| 3 teaspoons per gallon | Table Salt |
| 3 teaspoons per gallon | Tumeric |

In a still further variation, there is a change in lemon juice/lime juice proportions. Water, vinegar are the same as in composition Variants 1-4 above, but the immersion time remains 8 minutes maximum.

To summarize, the ingredient ranges of the original composition and variations 1-4, there is provided the following desirable ranges:

| | | |
|---|---|---|
| Water | 40-84 fluid ounces | 32-66% |
| 5% White Vinegar Solution | 5-34 fluid ounces | 4-27% |
| Lemon Juice | 17-39 fluid ounces | 14-31% |
| Lime Juice | 17-39 fluid ounces | 14-31% |
| Total Liquid Volume per batch | 128 fluid ounces | 100% |
| 1.0 Gallon | | |

Admixed in the above Mixture are the following solid ingredients:

| | |
|---|---|
| 1-5 teaspoons per gallon | Table Salt |
| 1-5 teaspoons per gallon | Tumeric |

Lemon Juice:Lime Juice ratio is 2:1

Another embodiment of the composition of the present invention is according to the following formula:

| Ingredient | amt/1000 ml SS | amt/gal SS | amt/gal 8 fold Conc |
|---|---|---|---|
| Lemon juice (1 + 7) | 26.4 ml | 100.0 ml | 800.0 |
| Lime juice (1 + 6.5) | 26.4 ml | 100.0 ml | 800.0 |
| White Vinegar, 15% | 26.4 ml | 100.0 ml | 266.7 |
| Salt | 4.0 gm | 15 gm | 120.0 |
| Tumeric | 2.6 ml | 10 ml | 1718.3 |
| Total | 1000.0 ml | 3785.0 ml | 3785.0 |

Note:
SS = Single Strength - use as is
8-fold concentrate - use at 1 part concentrate plus 7 parts water Turmeric Extract is from Heavenly Flavors of Suffern, N.Y.

According to the above formula, lemon juice concentrate can be used, as long as it is mixed with seven parts water. The same is true with lime juice concentrate, as long as it is mixed with 6.5 parts water.

In this formula, the preferred concentration of both lemon and lime juice, each including lemon or lime juice concentrate and water as noted above, is about 20 percent each for lemon and lime juice, and the percentage of vinegar is about 7 percent.

In other applications in addition for fish preparation, the present invention is useful in applications such as ice blend exposures for hamburger and other chopped or ground meat in grinding machines, where the chopped or ground meat is exposed to ice. In the present invention, the composition can be frozen and mixed with the ice blend contacting the meat being ground.

The composition can also be used for preparing sausage in the sausage cooking/rinse cycle of a meat smokehouse.

In preparation of tubular frankfurter hot dogs, the composition can be applied in the steam-exposed skinning and skin removal phases of the production of the tubular product at 160 degree F., where the skin is blown off of the tubular meat product.

The product can also be topically applied to fresh meat, processed meat, chicken and seafood by brushing, spraying or rinsing.

The composition can also be sprayed or brushed upon food preparation equipment in restaurants or home kitchens, such as meat slicers, and food preparation surfaces, such as wooden or plastic cutting boards, for sanitation thereof.

For displayed produce, the composition can be applied by spraying or surface rinse for freshness and extended shelf life.

In agriculture, the composition and process can be used for a feed spray to sanitize livestock feed materials and can be used as a livestock wash for the eyes and mouth of livestock, such as cattle or sheep.

The suggested usage rate for Composition of the present invention is as follows:

a) For cut red meats (beef, pork, lamb):
   For the average size piece in weight range up to 6 ounces-1 ounce (2 tbsp).
   For the larger size pieces use 1 ounce for every 4 ounces.
b) For chicken
   For every ½ pound use 1½ ounce (3 TBSP).

The composition of the present invention should be applied to the outside surface of the meat, except for hamburger or ground meats where it is applied in an ice blend contacting the granules of meat being ground.

For non-ground meat, such as steaks, fillets, breasts, etc., it should be worked into the surface with a moderately stiff brush making sure that the surface has been completely covered. It should be left in place a minimum of 5 minutes before being rinsed off.

TESTING EXAMPLES

The evaluation of disinfecting characteristics of the composition and treatment process of the invention is illustrated by the following specific examples which are provided herein for purposes of illustration only and are not intended to limit the scope therein.

The following tests of a combination of ingredients and proportions thereof comprising a treatment composition and a process for preparing raw fresh fish for cooking were conducted under laboratory conditions. Before the treatment composition of the present invention is used, samples of raw fresh fish are cleaned in a conventional manner. Such cleaning involves eviscerating the fish, optionally removing the head, and removing any scales by conventional means. The treatment composition of the present invention is intended to be used in accordance with the practice of the invention to clean, deodorize, and disinfect the raw fresh fish after conventional cleaning and before cooking.

The objects of the present invention are to remove slime and odor from fresh fish in preparation for cooking, and further, to disinfect the fish to be cooked in the event that harmful bacteria or other microorganisms reside on the raw fish. Such harmful microorganisms may be a residue of polluted water from which the fish is taken, or may have originated from filthy food preparation facilities.

Example 1

In order to demonstrate that the treatment composition and process of the invention kills or removes pathogenic bacteria which may be upon the surface of raw fresh fish, laboratory testing is conducted. The following is a report of the procedures, tests and results. A bacteria count on raw fresh fish is conducted by means of standard plate counts.

Six different kinds of fresh fish are purchased at a fish market. Cutting utensils and cutting surfaces are cleaned, and each of the six kinds of fish are cut into two pieces, with one piece of each kind of fish being placed in a clean sample bag without any treatment. The other piece of each of the six kinds of fish (the test sample) is immersed in a treatment bath containing the following ingredients and proportions thereof:

| | | |
|---|---|---|
| Water | 64 fluid ounces | |
| 5% White Vinegar Solution | 10 fluid ounces | |
| Lemon Juice | 27 fluid ounces | |
| Lime Juice | 27 fluid ounces | |
| Total Liquid Volume per batch 1.0 Gallon | 128 fluid ounces | 100% |

Admixed in the above Mixture are the following solid ingredients:

| | |
|---|---|
| 3 teaspoons per gallon | Table Salt |
| 3 teaspoons per gallon | Tumeric |

Each test sample of fish is immersed in the treatment bath for 5 minutes and vigorously agitated for 30 seconds after which the sample is washed in cold water.

After this five-minute immersion and washing, each of the six test samples was separately placed into a clean plastic sample bag. There were thus 12 samples taken to the laboratory -control (untreated) pieces of fish and 6 experimental (treated) pieces of fish, all raw, and all purchased approximately 15 minutes before the preparation of the samples.

The control and experimental samples were transported to the laboratory immediately after the samples were prepared, and were ready for testing and one half hours after having been purchased at a fish market.

The fish samples comprised the following different kinds of fish:

| |
|---|
| Control Sample (No Treatment) |
| 1. Red Snapper |
| 2. Blue Fish |
| 3. Whiting |
| 4. Grouper |
| 5. Salmon |
| 6. Scrod |
| Test Sample (5 Minute Immersion in the inventive composition) |

| |
|---|
| 7. Red Snapper |
| 8. Blue Fish |
| 9. Whiting |
| 10. Grouper |
| 11. Salmon |
| 12. Scrod |

Samples 1 and 7, are prepared by cutting a single Red Snapper into two equivalent-sized pieces. One being the control (Sample 1) and the other being the experiment (Sample 7). In this manner, whatever bacteria may have been present upon the purchased sample of Red Snapper is determined because the control sample was submitted to the laboratory without treatment. The only difference between sample 1 and sample 7 was the treatment given to sample 7 as described above. Thus, the effects of bacteria reduction can only be attributed to treatment with the present invention. The remaining samples are prepared in an identical fashion.

A Standard Plate Count procedure is used to determine the presence of bacteria upon each of the samples. The results obtained are summarized below:

The bacteria count showed a dramatic decrease for 5 of the 6 fish samples treated with the composition of the present invention. In one of the fish samples there was a significant decrease in the bacteria count of the treated fish sample, but the decrease was not dramatic.

Specifically, the results from the standard bacteria plate counts reported by Ameritech Laboratories were as follows:

TABLE 1

RESULTS

| | Bacteria Per Gram |
|---|---|
| Control Sample [No treatment] | |
| 1. Red Snapper | 2480 |
| 2. Blue Fish | 12400 |
| 3. Whiting | 8060 |
| 4. Grouper | 89280 |
| 5. Salmon | 161200 |
| 6. Scrod | 86800 |
| Test Sample [5 Min Immersion] in Present Invention | |
| 7. Red Snapper | 496 |
| 8. Blue Fish | 11160 |
| 9. Whiting | 1550 |
| 10. Grouper | 49600 |
| 11. Salmon | 7440 |
| 12. Scrod | 6200 |

Example 2

This example illustrates disinfecting raw fresh food products using the composition and process of the present invention.

A treatment composition prepared with the proportion of ingredients described in Example 1 is used in this Example.

The pH of Example 2 is determined to be 2.58.

Samples of five different food products (meat, fish and fowl) are purchased. Cutting utensils and surfaces are cleaned, and each of the four kinds of food (ground beef, sliced steak, pork and chicken) are cut into two pieces, with one piece of each type of food products being placed in a clean sample bag without any treatment. The other piece of each of five kinds of sample food precuts is immersed in a treatment bath (prepared as described in Example 1) using the treatment procedure described in Example 1 (5 minute immersion including 30 second vigorous agitation). Each of the test samples are washed in water and separately placed in clean plastic sample bags.

The control and experimental samples of food products are transported for laboratory testing which started within 2 hours after purchase of the food products, a Standard Plate Count bacteria analysis presence of bacteria.

The results were as follows for standard plate count of bacteria:

TABLE 2

RESULTS

| Examination of: | Untreated | Treated | Percent Reduction |
|---|---|---|---|
| Hamburger | 3348000 | 7300 | 99.78 |
| Sliced Steak | 744000 | 2600 | 99.65 |
| Pork | 4464000 | 12000 | 99.73 |
| Chicken | 6820000 | 13100 | 98.92 |
| Fish | 2790000 | 30000 | 98.92 |

Example 3

As shown in Table 3 herein, a test was conducted at Ameritech Laboratories in College Point, N.Y. to test the efficacy of the composition and process of the present invention in treating hot dog frankfurters.

The purpose of this study was to determine the effectiveness of the composition of the present invention as an agent to control the growth of microorganisms on packaged hotdogs.

Locally purchased hotdogs were used for this study. All test items were examined for freshness. Immediately prior to application of the bacterial culture, each hotdog was immersed in boiling water for 10 seconds followed by cooling for a minimum of 2 minutes before the application of the bacteria culture.

Stock cultures of the following bacteria were prepared: *E. Coli, Salmonella-typhimurium, Listeria Monocytogenes, Staphylococcus Aureus* and *Clostridium Perfringins*. These cultures were prepared so as to have approximately 10 million bacteria per milliliter. For application the cultures were diluted by a factor of 5, 50 and 500.

The 2 milliliters of each culture was applied to the surface of the hotdog, covering as much of the surface as possible. The culture was spread evenly and allowed to dry for 4 hours. At the end of four hours, the hotdogs were coated with the composition of the present invention by spraying so as to be completely covered. The sprayed hotdogs were placed in sterile plastic bags, three to a bag. Control groups of each culture were also prepared. The bags with the *Clostridium* cultures were vacuum-sealed, all others were closed with only a small amount of air remaining. After closing, the bags were placed in a refrigerator at 40 degrees F. until removed for analysis.

Prior to analysis, the bags were removed from the refrigerator and allowed to come to room temperature. The hot dogs were there rinsed under a stream of cool water to remove the coating composition. No scrubbing was applied. The hot dogs were then placed in 100 ml of sterile buffer prior to plating the buffer. The rinsing procedure was applied to the samples run on day 0 which were not refrigerated.

TABLE 3

| | Results: | | | | |
|---|---|---|---|---|---|
| | Day 0 | | | | |
| | E. Coli | Salmon. | Listeria | Staph. | Clostrid. |
| High Level Control | | | | | |
| 1 | 2,760,000 | 1,300,000 | 2,760,000 | 867,000 | 907,000 |
| 2 | 1,950,000 | 1,420,000 | 1,140,000 | 765,000 | 973,000 |
| 3 | 2,320,000 | 1,160,000 | 2,250,000 | 843,000 | 892,000 |
| avg | 2,343,333 | 1,293,333 | 2,050,000 | 825,000 | 924,000 |
| | Composition of the present invention | | | | |
| 1 | 37600 | 8560 | 59200 | 13100 | 32000 |
| 2 | 41600 | 7150 | 53200 | 11700 | 25200 |
| 3 | 34100 | 7320 | 51400 | 11900 | 31000 |
| avg | 37767 | 7677 | 54600 | 12233 | 29400 |
| avg % reduction | 98.39 | 99.41 | 97.34 | 98.52 | 96.82 |
| Low Level Control | | | | | |
| 1 | 24,100 | 12,700 | 36,200 | 10,700 | 12,100 |
| 2 | 20,300 | 15,200 | 28,400 | 11,400 | 10,600 |
| 3 | 18,300 | 14,700 | 31,000 | 10,100 | 10,200 |
| avg | 20,900 | 14,200 | 31,867 | 10,733 | 10,967 |
| | Composition of the present invention | | | | |
| 1 | 126 | 530 | 592 | 131 | 320 |
| 2 | 328 | 450 | 532 | 117 | 252 |
| 3 | 276 | 662 | 514 | 119 | 310 |
| avg | 243 | 547 | 546 | 122 | 294 |
| avg % reduction | 98.84 | 96.15 | 98.29 | 98.86 | 97.32 |

TABLE 3-continued

|  | Results: | | | | |
|---|---|---|---|---|---|
|  | Day 1 | | | | |
|  | E. Coli | Salmon. | Listeria | Staph. | Clostrid. |
| High Level Control | | | | | |
| 1 | 2,150,000 | 1,370,000 | 2,840,000 | 875,000 | 657,000 |
| 2 | 2,310,000 | 1,290,000 | 2,720,000 | 732,000 | 542,000 |
| 3 | 1,820,000 | 1,520,000 | 2,430,000 | 804,000 | 743,000 |
| avg | 2,093,333 | 1,393,333 | 2,663,333 | 803,667 | 647,333 |
| | Composition of the present invention | | | | |
| 1 | 29500 | 5780 | 50400 | 15200 | 22500 |
| 2 | 34200 | 6320 | 62500 | 18300 | 26900 |
| 3 | 25100 | 7070 | 50300 | 12600 | 19400 |
| avg | 29600 | 6390 | 54400 | 15367 | 22933 |
| avg % reduction | 98.59 | 99.54 | 97.96 | 98.09 | 96.46 |
| Low Level Control | | | | | |
| 1 | 18,300 | 13,500 | 33,700 | 11,800 | 9,600 |
| 2 | 19,700 | 14,700 | 32,900 | 12,600 | 7,200 |
| 3 | 16,200 | 15,900 | 27,600 | 9,500 | 10,400 |
| avg | 18,067 | 14,700 | 31,400 | 11,300 | 9,067 |
| | Composition of the present invention | | | | |
| 1 | 333 | 576 | 322 | 108 | 156 |
| 2 | 249 | 423 | 572 | 85 | 182 |
| 3 | 385 | 486 | 287 | 128 | 295 |
| avg | 322 | 495 | 394 | 107 | 211 |
| avg % reduction | 98.22 | 96.63 | 98.75 | 99.05 | 97.67 |
| | Day 2 | | | | |
|  | E. Coli | Salmon. | Listeria | Staph. | Clostrid. |
| High Level Control | | | | | |
| 1 | 2,830,000 | 1,720,000 | 2,790,000 | 1,020,000 | 594,000 |
| 2 | 3,140,000 | 1,420,000 | 3,040,000 | 970,000 | 627,000 |
| 3 | 2,350,000 | 1,960,000 | 2,560,000 | 1,110,000 | 757,000 |
| avg | 2,773,333 | 1,700,000 | 2,796,667 | 1,033,333 | 659,333 |
| | Composition of the present invention | | | | |
| 1 | 25600 | 15600 | 43200 | 23100 | 11800 |
| 2 | 22000 | 17400 | 50200 | 19300 | 15600 |
| 3 | 27200 | 18200 | 51500 | 20700 | 18200 |
| avg | 24933 | 17067 | 48300 | 21033 | 15200 |
| avg % reduction | 99.10 | 99.00 | 98.27 | 97.96 | 97.69 |
| Low Level Control | | | | | |
| 1 | 16,100 | 15,600 | 28,200 | 14,700 | 7,200 |
| 2 | 18,800 | 18,300 | 31,600 | 13,300 | 9,400 |
| 3 | 15,600 | 14,700 | 27,200 | 16,200 | 8,800 |
| avg | 16,833 | 16,200 | 29,000 | 14,733 | 8,467 |
| | Composition of the present invention | | | | |
| 1 | 293 | 486 | 336 | 87 | 122 |
| 2 | 268 | 527 | 295 | 152 | 176 |
| 3 | 367 | 445 | 313 | 98 | 198 |
| avg | 309 | 486 | 315 | 112 | 165 |
| avg % reduction | 98.16 | 97.00 | 98.91 | 99.24 | 98.05 |
| | Day 4 | | | | |
|  | E. Coli | Salmon. | Listeria | Staph. | Clostrid. |
| High Level Control | | | | | |
| 1 | 3,950,000 | 1,820,000 | 2,790,000 | 1,010,000 | 702,000 |
| 2 | 3,320,000 | 2,230,000 | 3,130,000 | 1,050,000 | 657,000 |
| 3 | 2,760,000 | 2,470,000 | 2,980,000 | 1,080,000 | 602,000 |
| avg | 3,343,333 | 2,173,333 | 2,966,667 | 1,046,667 | 653,667 |

TABLE 3-continued

Results:

Composition of the present invention

| | | | | | |
|---|---|---|---|---|---|
| 1 | 20800 | 18800 | 44700 | 28000 | 14100 |
| 2 | 22900 | 15600 | 38900 | 17200 | 10400 |
| 3 | 23500 | 12700 | 40300 | 13100 | 6500 |
| avg | 22400 | 15700 | 41300 | 19433 | 10333 |
| avg % reduction | 99.33 | 99.28 | 98.61 | 98.14 | 98.42 |

Low Level Control

| | | | | | |
|---|---|---|---|---|---|
| 1 | 21,300 | 18,900 | 26,000 | 19,400 | 10,400 |
| 2 | 20,700 | 13,800 | 29,600 | 20,300 | 8,300 |
| 3 | 18,200 | 17,200 | 36,100 | 22,600 | 7,800 |
| avg | 20,067 | 16,633 | 30,567 | 20,767 | 8,833 |

Composition of the present invention

| | | | | | |
|---|---|---|---|---|---|
| 1 | 156 | 336 | 170 | 101 | 113 |
| 2 | 453 | 367 | 226 | 75 | 124 |
| 3 | 245 | 408 | 256 | 83 | 206 |
| avg | 285 | 370 | 217 | 86 | 148 |
| avg % reduction | 98.58 | 97.77 | 99.29 | 99.58 | 98.33 |

Day 7

| | E. Coli | Salmon. | Listeria | Staph. | Clostrid. |
|---|---|---|---|---|---|

High Level Control

| | | | | | |
|---|---|---|---|---|---|
| 1 | 5,640,000 | 2,070,000 | 2,990,000 | 1,420,000 | 814,000 |
| 2 | 4,360,000 | 3,210,000 | 4,720,000 | 1,250,000 | 727,000 |
| 3 | 5,250,000 | 2,670,000 | 4,230,000 | 1,320,000 | 733,000 |
| avg | 5,083,333 | 2,650,000 | 3,980,000 | 1,330,000 | 758,000 |

Composition of the present invention

| | | | | | |
|---|---|---|---|---|---|
| 1 | 34600 | 12700 | 33500 | 13700 | 10600 |
| 2 | 18200 | 14300 | 42600 | 22400 | 9600 |
| 3 | 24300 | 14800 | 32100 | 20600 | 12500 |
| avg | 25700 | 13933 | 36067 | 18900 | 10900 |
| avg % reduction | 99.49 | 99.47 | 99.09 | 98.58 | 98.56 |

Low Level Control

| | | | | | |
|---|---|---|---|---|---|
| 1 | 34,800 | 22,100 | 45,600 | 28,300 | 7,100 |
| 2 | 38,200 | 17,800 | 38,000 | 16,500 | 11,400 |
| 3 | 23,200 | 21,700 | 42,000 | 25,700 | 9,200 |
| avg | 32,067 | 20,533 | 41,867 | 23,500 | 9,233 |

Composition of the present invention

| | | | | | |
|---|---|---|---|---|---|
| 1 | 220 | 550 | 143 | 156 | 92 |
| 2 | 180 | 360 | 192 | 62 | 180 |
| 3 | 300 | 290 | 243 | 112 | 240 |
| avg | 233 | 400 | 193 | 110 | 171 |
| avg % reduction | 99.27 | 98.05 | 99.54 | 99.53 | 98.15 |

Day 14

| | E. Coli | Salmon. | Listeria | Staph. | Clostrid. |
|---|---|---|---|---|---|

High Level Control

| | | | | | |
|---|---|---|---|---|---|
| 1 | 6,240,000 | 2,850,000 | 4,770,000 | 1,620,000 | 779,000 |
| 2 | 7,500,000 | 2,680,000 | 4,480,000 | 1,170,000 | 882,000 |
| 3 | 6,300,000 | 3,210,000 | 3,950,000 | 1,720,000 | 823,000 |
| avg | 6,680,000 | 2,913,333 | 4,400,000 | 1,503,333 | 828,000 |

Composition of the present invention

| | | | | | |
|---|---|---|---|---|---|
| 1 | 22600 | 9600 | 51000 | 14000 | 11200 |
| 2 | 28500 | 8200 | 28000 | 12300 | 8400 |
| 3 | 14600 | 16700 | 22100 | 16300 | 9500 |
| avg | 21900 | 11500 | 33700 | 14200 | 9700 |
| avg % reduction | 99.67 | 99.61 | 99.23 | 99.06 | 98.83 |

Low Level Control

| | | | | | |
|---|---|---|---|---|---|
| 1 | 55,000 | 28,000 | 44,100 | 33,100 | 8,400 |
| 2 | 44,000 | 23,200 | 46,200 | 15,000 | 12,100 |

TABLE 3-continued

| | | | Results: | | |
|---|---|---|---|---|---|
| 3 | 52,000 | 29,000 | 39,000 | 28,900 | 7,800 |
| avg | 50,333 | 26,733 | 43,100 | 25,667 | 9,433 |
| | | Composition of the present invention | | | |
| 1 | 160 | 330 | 180 | 130 | 110 |
| 2 | 183 | 180 | 106 | 87 | 75 |
| 3 | 254 | 300 | 200 | 65 | 175 |
| avg | 199 | 270 | 162 | 94 | 120 |
| avg % reduction | 99.60 | 98.99 | 99.62 | 99.63 | 98.73 |

Example 4

In an examination of Beef and Chicken at Ameritech Laboratories, the analysis requested was a Microbiology Challenge Study of *Listeria* and *E. Coli*.

Two pieces of meat, Beef and Chicken, of Uniform thickness (approx. ½") were cut into 1 cm squares, immersed in hot water at 185 deg C. for 2 minutes, and then put in the refrigerator to cool.

The pieces were divided into 4 sets which were handled in the following manner; set 1-no further treatment, Sets 2, 3 & 4 were immersed in *Listeria* or *E. Coli* cultures to coat the pieces with these organisms. Removed, held at room temperature for 6 hours, and then all 4 sets were refrigerated overnight.

The following morning, the samples were removed from the refrigerator. Set #4 was treated with "Composition of the present invention" according to the usual procedure, following which sets 3 and 4 were washed with warm tap water.

All sets of both beef and chicken were then analyzed for bacteria counts.

TABLE 4

| | | | Results: | | |
|---|---|---|---|---|---|
| | #1 | #2 | #3 | #4 | #4% reduction (#4/#2) × 100 |
| Beef-*Listeria* | | | | | |
| 1 | ND | 1650000 | 790000 | 31600 | 98.1 |
| 2 | ND | 1470000 | 720000 | 11400 | 99.2 |
| 3 | ND | 1870000 | 970000 | 21400 | 98.9 |
| 4 | ND | 1380000 | 662000 | 9500 | 99.3 |
| 5 | ND | 2060000 | 1160000 | 24900 | 98.8 |
| 6 | ND | 1540000 | 617000 | 9900 | 99.4 |
| Beef-*E. Coli* | | | | | |
| 1 | ND | 2700000 | 670000 | 19900 | 99.3 |
| 2 | ND | 2200000 | 912000 | 48200 | 97.8 |
| 3 | ND | 2940000 | 574000 | 35200 | 98.8 |
| 4 | ND | 2030000 | 294000 | 31300 | 98.5 |
| 5 | ND | 3020000 | 720000 | 23100 | 99.2 |
| 6 | ND | 2570000 | 454000 | 12400 | 99.5 |
| Chicken - *Listeria* | | | | | |
| 1 | ND | 1350000 | 116000 | 9500 | 99.3 |
| 2 | ND | 1660000 | 362000 | 8700 | 99.5 |
| 3 | ND | 1920000 | 268000 | 16000 | 99.2 |
| 4 | ND | 1560000 | 253000 | 19400 | 98.8 |
| 5 | ND | 1620000 | 147000 | 12700 | 99.2 |
| 6 | ND | 1770000 | 247000 | 8300 | 99.5 |
| Chicken - *E. Coli* | | | | | |
| 1 | ND | 2910000 | 389000 | 27600 | 99.1 |
| 2 | ND | 2470000 | 520000 | 27500 | 98.9 |
| 3 | ND | 3120000 | 374000 | 22400 | 99.3 |
| 4 | ND | 3040000 | 242000 | 16200 | 99.5 |
| 5 | ND | 2190000 | 227000 | 9500 | 99.6 |
| 6 | ND | 2570000 | 462000 | 12000 | 99.5 |

\* = 100 − ((#4/#2) × 100)
ND = Not detected

Example 5

The Composition of the present invention was studied as a Surface Cleaner for food preparation surfaces.

The purpose of this study was to determine the effectiveness of Composition of the present invention as a cleaning agent for equipment and structural surfaces.

The following materials were tested using square, smooth, flat surfaces: aluminum, stainless steel, ceramic tile, glass, porcelain and PVC plastic.

Stock cultures of the following bacteria were prepared: *E. Coli, Salmonella typhimurium, Listeria Monocytogenes* and *Staphylococcus Aureus*. These cultures were prepared so as to have approximately 1 million bacteria per milliliter.

The 2 milliliters of each culture was applied to an area 2 inches square on 9 samples of each surface type. The culture was spread evenly and allowed to dry and then stay overnight.

The nine samples of each surface type were divided into three groups of three. One group was used as the control group. The second and third group were treated with Composition of the present invention by spraying the material on the surface until 100 percent of the test area was covered. One of these sets was allowed to sit for 15 minutes which was followed by a warm water (approximately 45 deg. C.) spray rinse. The spray rinse was adjusted so as to have a moderate speed and force. The last set of samples was treated the same as the second with the exception at the end of the 15 minute waiting period the surface was scrubbed with moderate force with a brush with moderately stiff bristles prior to the water rinse.

At the end of the treatments, all three sets of samples were tested for bacteria counts using the swab technique covering the full 2 square inches.

TABLE 5

Results:

| | E. Coli | Salmon. | Listeria | Staph. |
|---|---|---|---|---|
| Stainless Steel | | | | |
| 1 | 1240000 | 1720000 | 986000 | 1650000 |
| 2 | 1070000 | 1310000 | 1320000 | 1780000 |
| 3 | 1480000 | 1560000 | 1080000 | 1220000 |
| avg | 1263333 | 1530000 | 1128667 | 1550000 |
| 4 | 7920 | 24200 | 18600 | 14500 |
| 5 | 4920 | 7500 | 1870 | 24900 |
| 6 | 12180 | 12100 | 17400 | 9720 |
| avg | 8340 | 14600 | 12623 | 16373 |
| avg % reduction | 99.340 | 99.046 | 98.882 | 98.944 |
| 7 | 36 | 24 | 150 | 104 |
| 8 | 12 | 103 | 131 | 87 |
| 9 | 89 | 5 | 22 | 17 |
| avg | 46 | 44 | 101 | 69 |
| avg % reduction | 99.996 | 99.997 | 99.991 | 99.996 |
| Aluminum | | | | |
| 1 | 1042000 | 1560000 | 1140000 | 1820000 |
| 2 | 943000 | 1720000 | 1530000 | 1710000 |
| 3 | 1310000 | 1840000 | 1020000 | 1920000 |
| avg | 1098333 | 1706667 | 1230000 | 1816667 |
| 4 | 13500 | 10500 | 8430 | 12700 |
| 5 | 2540 | 35300 | 58300 | 11400 |
| 6 | 11060 | 18900 | 11200 | 6340 |
| avg | 9033 | 21567 | 25977 | 10147 |
| avg % reduction | 99.178 | 98.736 | 97.888 | 99.441 |
| 7 | 156 | 0 | 11 | 158 |
| 8 | 8 | 54 | 5 | 62 |
| 9 | 67 | 127 | 37 | 19 |
| avg | 77 | 60 | 18 | 80 |
| avg % reduction | 99.993 | 99.986 | 99.999 | 99.996 |
| Ceramic Tile | | | | |
| 1 | 1540000 | 1820000 | 1190000 | 1370000 |
| 2 | 1260000 | 1620000 | 1070000 | 1450000 |
| 3 | 1420000 | 1320000 | 921000 | 1620000 |
| avg | 1406667 | 1586667 | 1060333 | 1480000 |
| 4 | 4920 | 64500 | 24500 | 9760 |
| 5 | 12750 | 39400 | 11430 | 25600 |
| 6 | 31300 | 11020 | 6520 | 31500 |
| avg | 16323 | 38307 | 14150 | 22287 |
| avg % reduction | 98.840 | 97.586 | 98.666 | 98.494 |
| 7 | 350 | 17 | 27 | 61 |
| 8 | 56 | 135 | 91 | 30 |
| 9 | 16 | 45 | 14 | 87 |
| avg | 141 | 66 | 44 | 39 |
| avg % reduction | 99.990 | 99.996 | 99.996 | 99.997 |
| Glass | | | | |
| 1 | 1250000 | 1420000 | 956000 | 1690000 |
| 2 | 1430000 | 1670000 | 1450000 | 1570000 |
| 3 | 1230000 | 1750000 | 1130000 | 1830000 |
| avg | 1303333 | 1613333 | 1178667 | 1696667 |
| 4 | 37800 | 9700 | 6650 | 17900 |
| 5 | 26500 | 28300 | 11400 | 6970 |
| 6 | 19600 | 16500 | 33400 | 12400 |
| avg | 27967 | 18167 | 17150 | 12423 |
| avg % reduction | 97.854 | 98.874 | 98.545 | 99.268 |
| 7 | 156 | 0 | 11 | 158 |
| 8 | 8 | 54 | 5 | 62 |
| 9 | 67 | 127 | 37 | 19 |
| avg | 77 | 60 | 18 | 80 |
| avg % reduction | 99.994 | 99.996 | 99.999 | 99.995 |

TABLE 5-continued

Results:

| | E. Coli | Salmon. | Listeria | Staph. |
|---|---|---|---|---|
| Porcelain | | | | |
| 1 | 1370000 | 1360000 | 1140000 | 1470000 |
| 2 | 1420000 | 1310000 | 1100000 | 1850000 |
| 3 | 1150000 | 1620000 | 1240000 | 1620000 |
| avg | 1313333 | 1430000 | 1160000 | 1646667 |
| 4 | 23700 | 32400 | 18200 | 21300 |
| 5 | 13400 | 54200 | 13100 | 10400 |
| 6 | 10300 | 15300 | 7400 | 8300 |
| avg | 15800 | 33967 | 12900 | 13333 |
| avg % reduction | 99.797 | 97.625 | 98.888 | 99.190 |
| 7 | 247 | 47 | 75 | 104 |
| 8 | 102 | 0 | 14 | 87 |
| 9 | 65 | 23 | 165 | 17 |
| avg | 138 | 23 | 85 | 69 |
| avg % reduction | 99.989 | 99.998 | 99.993 | 99.996 |
| PVC Plastic | | | | |
| 1 | 1570000 | 1650000 | 945000 | 1570000 |
| 2 | 1640000 | 1320000 | 894000 | 1430000 |
| 3 | 1420000 | 1720000 | 1160000 | 1810000 |
| avg | 1543333 | 1563333 | 999667 | 1603333 |
| 4 | 7820 | 23100 | 16000 | 16700 |
| 5 | 44400 | 69500 | 10400 | 42000 |
| 6 | 21300 | 13700 | 4320 | 32800 |
| avg | 24507 | 35433 | 10240 | 32800 |
| avg % reduction | 98.412 | 97.733 | 98.976 | 97.954 |
| 7 | 76 | 47 | 56 | 95 |
| 8 | 6 | 0 | 106 | 16 |
| 9 | 34 | 82 | 122 | 7 |
| avg | 39 | 43 | 95 | 39 |
| avg % reduction | 99.997 | 99.997 | 99.991 | 99.998 |

Based on the above results, the composition of the present invention can produce a significant reduction in surface bacteria on the materials studied.

Example 6

In further tests by Associated Analytical Laboratories, Inc. of New York, N.Y. a test was made of a sample of the composition of the present invention as an all natural anti-bacterial Marinade to reduce *E. Coli* & *Salmonella* by over 95%

Batch #C99175-3 21:13—made in Canada

Test: verify claimed effectiveness.

Reference Procedures: Official Methods of Analysis of A.O.A.C. International, 16$^{th}$ Ed, A.O.A.C. method 960.09

Cultures used for Exposure: *Escherichia Coli*, ATCC #11229
*Salmonella Cholerasuis*, ATCC #98-12

TABLE 6

REPORT OF FINDINGS

| | E. Coli | Salmonella |
|---|---|---|
| INITIAL BACTERIA COUNT/ml | 5.13 × 10ninth | 4.49 × 10ninth |
| BACTERIA COUNT/ml, after 5 minute exposure | 1.48 × 10eighth | 1.44 × 10eighth |
| % REDUCTION after 5 minute exposure | 97.1150% | 96.7929% |

TABLE 6-continued

REPORT OF FINDINGS

| | E. Coli | Salmonella |
|---|---|---|
| CULTURES ALLOWED TO AIR DRY @ 35 DEG C. PRIOR TO REEXAMINATION | | |
| BACTERIA COUNT/ml after 7 day exposure | $7.54 \times 10^{seventh}$ | $5.94 \times 10^{seventh}$ |
| % REDUCTION after 7 day exposure | 99.1150% | 98.6771% |
| NUMBER CONTROL INTERPRETATION: | $5.13 \times 10^{ninth}$ EFFECTIVE | $4.46 \times 10^{ninth}$ EFFECTIVE |

Example 7

In another test by Associated Analytical Laboratories, Inc. a sample of the composition of the present invention was tested as an all natural anti-bacterial Marinade said to reduce numbers of pathogenic bacteria:

Batch #C99175-3 21:13—made in Canada

Test: verify claimed effectiveness.

Reference Procedures: Official Methods of Analysis of A.O.A.C. International, 16$^{th}$ Ed, A.O.A.C. method 960.09

Cultures used for Exposure: *STAPHYLOCOCCUS AUREUS*, ATCC 6538 *CAMPYLOBACTER, JEJUNI*, ATCC 33560

TABLE 7

REPORT OF FINDINGS

| | STAPHYLOCOCCUS | CAMPYLOBACTER |
|---|---|---|
| INITIAL BACTERIA COUNT/ml | $5.03 \times 10^{ninth}$ | $3.33 \times 10^{ninth}$ |
| BACTERIA COUNT/ml, after 5 minute exposure | $3.33 \times 10^{eighth}$ | $1.08 \times 10^{ninth}$ |
| % REDUCTION after 5 minute exposure | 93.3797% | 67.5676% |
| CULTURES ALLOWED TO AIR DRY @ 35 DEG C. PRIOR TO REEXAMINATION | | |
| BACTERIA COUNT/ml after 7 day exposure | $1.60 \times 10^{ninth}$ | $8.87 \times 10^{eighth}$ |
| % REDUCTION after 7 day exposure | 96.8191% | 73.3634% |
| NUMBER CONTROL INTERPRETATION: | $5.02 \times 10^{ninth}$ EFFECTIVE @ >96% | $3.32 \times 10^{ninth}$ EFFECTIVE @ >73% |

Example 8

In yet another test by Associated Analytical Laboratories, Inc., a sample of the composition of the present invention was made as an all natural anti-bacterial Marinade said to reduce numbers of pathogenic bacteria.

Batch #C99175-3 21:13—made in Canada

Test: verify claimed effectiveness.

Reference Procedures: Official Methods of Analysis of A.O.A.C. International, 16$^{th}$ Ed, A.O.A.C. method 960.09

Cultures used for Exposure: *CLOSTRIDIUM PERFRINGENS*, ATCC 3624 *YERSINIA ENTEROCOLITICA*, ATCC 55075

TABLE 8

REPORT OF FINDINGS

| | CLOSTRIDIUM | YERSINIA |
|---|---|---|
| INITIAL BACTERIA COUNT/ml | $5.26 \times 10^{ninth}$ | $3.61 \times 10^{ninth}$ |
| BACTERIA COUNT/ml, after 5 minute exposure | $5.98 \times 10^{eighth}$ | $6.20 \times 10^{eighth}$ |
| % REDUCTION after 5 minute exposure | 88.6312% | 82.8255% |
| CULTURES ALLOWED TO AIR DRY @ 35 DEG C. PRIOR TO REEXAMINATION | | |
| BACTERIA COUNT/ml after 7 day exposure | $2.944 \times 10^{eighth}$ | $4.09 \times 10^{eighth}$ |
| % REDUCTION after 7 day exposure | 94.4106% | 88.6704% |
| NUMBER CONTROL INTERPRETATION: | $5.25 \times 10^{ninth}$ EFFECTIVE @ >94% | $3.62 \times 10^{ninth}$ EFFECTIVE @ >88% |

Example 9

In another example, a test by Associated Analytical Laboratories studied Batch #C99175-3 21:13, which was made in Canada to verify claimed effectiveness against *Listeria Monocytogenes*, ATCC 4428 and *Vibrio Cholerae*, ATCC 582.

Reference Procedures: Official Methods of Analysis of A.O.A.C. International, 16$^{th}$ Ed, A.O.A.C. method 960.09

Cultures used for Exposure: *LISTERIA MONOCYTOGENES*, ATCC 4428 *VIBRIO CHOLERAE*, ATCC 582

TABLE 9

REPORT OF FINDINGS

| | LISTERIA | VIBRIO |
|---|---|---|
| INITIAL BACTERIA COUNT/ml | $1.61 \times 10^{ninth}$ | $3.98 \times 10^{ninth}$ |
| BACTERIA COUNT/ml, after 5 minute exposure | $4.04 \times 10^{eighth}$ | $1.21 \times 10^{ninth}$ |
| % REDUCTION after 5 minute exposure | 74.9068% | 69.5980% |
| CULTURES ALLOWED TO AIR DRY @ 35 DEG C. PRIOR TO REEXAMINATION | | |
| BACTERIA COUNT/ml after 7 day exposure | $6.82 \times 10^{seventh}$ | $5.35 \times 10^{eighth}$ |
| % REDUCTION after 7 day exposure | 95.7640% | 88.5578% |
| NUMBER CONTROL INTERPRETATION: | $1.60 \times 10^{ninth}$ EFFECTIVE @ >95% | $3.99 \times 10^{ninth}$ EFFECTIVE @ >88% |

The above results clearly point to the efficacy of the present invention in reducing the bacteria count of food samples treated therewith. The results are properly characterized as consistent and dramatic in reducing bacteria on food to be cooked.

While a preferred embodiment of the invention has been described and shown, it is to be clearly understood that the same is susceptible to numerous changes and modifications apparent to those skilled in the art without departing from the scope of the appended claims.

I claim:

1. A process for cleaning and disinfecting raw meat without the need for cooking and with no application of heat, comprising the steps of:

a) providing a raw meat sample to be treated;

b) exposing said raw meat sample to a composition in a treatment bath consisting essentially of an aqueous mixture of about 49.2% by volume of water, about 8% by volume of a 5% vinegar solution, about 21% of lemon juice, about 21% by volume of lime juice, about 0.4% of salt and about 0.4% of turmeric, for a period of 4 to 8 minutes followed by a period of at least 30 seconds of vigorous agitation in said treatment bath;

c) removing the raw meat sample from the treatment bath; and d) washing the raw meat sample with water, thereby reducing bacterial count in said raw meat sample.

2. The process as claimed in claim 1, wherein said raw meat is selected from the group consisting of beef, poultry and sea food.

3. The process as claimed in claim 1, wherein said lemon juice is fresh squeezed fruit juice and said lime juice is fresh squeezed fruit juice.

4. A process for disinfecting raw food products for consumer display and/or cooking without the need for cooking and with no application of heat, comprising the steps of:

a) providing a raw food product to be treated;

b) exposing said raw food product to a composition in a treatment bath consisting essentially of an aqueous mixture of about 49.2% by volume of water, 8% by volume of a 5% vinegar solution, about 21% of lemon juice, about 21% by volume of lime juice, about 0.4% of salt and about 0.4% of turmeric, for a period of 4 to 8 minutes followed by a period of at least 30 seconds of vigorous agitation in said treatment bath;

c) removing the raw food product from the treatment bath; and d) washing the raw food product with water, thereby reducing bacterial count in said raw food product.

5. The process as claimed in claim 4, wherein said food product is selected from the group consisting of raw meat, raw sea food, and raw fowl.

6. The process as in claim 5 wherein said raw meat food product is a tubular formed meat.

7. The process as in claim 4 wherein said step of exposing and applying said composition to the raw food product comprises immersing said raw food product in said treatment bath of the composition.

8. The process as in claim 4 wherein said step of exposing and applying said composition comprises exposing ground meat to an ice blend containing the composition in frozen form.

9. The process as in claim 4 wherein said step of exposing and applying said composition comprises rinsing the product with said composition.

10. The process as in claim 4 wherein said step of exposing and applying said composition comprises spraying the product with said composition.

11. The process as in claim 4 wherein said step of exposing and applying said composition comprises exposing and steaming the product with said composition.

12. The process as in claim 4 wherein said raw food product is produce.

13. A process for extending the shelf life of raw food produce on display and the sanitizing of food preparation surfaces and equipment in restaurant and home kitchens, comprising the steps of:

a) placing on display said raw food produce;

b) spraying said raw food produce with a rinse consisting essentially of an aqueous mixture of about 49.2% by volume of water, 8% by volume of a 5% vinegar solution, about 21% of lemon juice, about 21% by volume of lime juice, about 0.4% of salt and about 0.4% of turmeric;

c) spraying or brushing on food preparation and equipment surfaces a rinse consisting essentially of an aqueous mixture of about 49.2% by volume of water, 8% by volume of a 5% vinegar solution, about 21% of lemon juice, about 21% by volume of lime juice, about 0.4% of salt and about 0.4% of turmeric; and d) then removing the respective rinses using water.

\* \* \* \* \*